(12) United States Patent
Yang et al.

(10) Patent No.: US 10,175,495 B2
(45) Date of Patent: Jan. 8, 2019

(54) WAVELENGTH SELECTIVE SWITCH

(71) Applicant: ACCELINK TECHNOLOGIES CO., LTD., Wuhan, Hubei (CN)

(72) Inventors: Liu Yang, Wuhan (CN); Rui Yang, Wuhan (CN); Zhilin Yuan, Wuhan (CN); Chang'an Li, Wuhan (CN); Jinping Guo, Wuhan (CN); Lidan Song, Wuhan (CN); Fan Wang, Wuhan (CN); Yuhong Ma, Wuhan (CN); Lihong Tang, Wuhan (CN)

(73) Assignee: ACCELINK TECHNOLOGIES CO., LTD., Wuhan, Hubei (CN)

( * ) Notice: Subject to any disclaimer, the term of this patent is extended or adjusted under 35 U.S.C. 154(b) by 154 days.

(21) Appl. No.: 15/388,986

(22) Filed: Dec. 22, 2016

(65) Prior Publication Data

US 2018/0059431 A1   Mar. 1, 2018

(30) Foreign Application Priority Data

Aug. 30, 2016 (CN) .......................... 2016 1 0768927
Aug. 30, 2016 (CN) .......................... 2016 1 0776059

(51) Int. Cl.
| | |
|---|---|
| *G02F 1/133* | (2006.01) |
| *G02B 27/42* | (2006.01) |
| *G02F 1/1333* | (2006.01) |
| *G02F 1/1335* | (2006.01) |
| *G02F 1/139* | (2006.01) |

(Continued)

(52) U.S. Cl.
CPC ....... *G02B 27/4244* (2013.01); *G02B 6/2706* (2013.01); *G02B 6/3512* (2013.01); *G02F 1/1393* (2013.01); *G02F 1/1396* (2013.01); *G02F 1/133385* (2013.01); *G02F 1/133553* (2013.01); *G02B 6/3548* (2013.01); *G02B 6/3592* (2013.01); *G02F 1/31* (2013.01)

(58) Field of Classification Search
CPC . G02B 27/4244; G02B 6/2706; G02B 6/3512
See application file for complete search history.

(56) References Cited

U.S. PATENT DOCUMENTS

| | | | |
|---|---|---|---|
| 7,254,293 B1* | 8/2007 | Helkey | G02B 6/29311 385/16 |
| 2003/0138213 A1* | 7/2003 | Jin | G02B 6/3518 385/47 |

(Continued)

*Primary Examiner* — James Dudek
(74) *Attorney, Agent, or Firm* — Peter Su (57) ABSTRACT

The present disclosure relates to wavelength selective switches. In one embodiment, a wavelength selective switch may include a liquid crystal (LC)-based attenuation switching device that has an LC switching module to switch an incident beam to one of a plurality of output paths. The LC switching module may include one or more LC switching cells. The LC-based attenuation switching device further includes a mirror to reflect the beam from the LC switching module so as to output the beam through a corresponding output port, and a temperature compensation module provided on a side of the mirror opposite to the LC switching module. The temperature compensation module may be configured to alter curvature of the mirror as temperature changes so as to compensate for deformation of the LC switching cells due to the temperature change.

16 Claims, 6 Drawing Sheets

(51) Int. Cl.
*G02B 6/35* (2006.01)
*G02B 6/27* (2006.01)
*G02F 1/31* (2006.01)

(56) References Cited

U.S. PATENT DOCUMENTS

2007/0077003 A1* 4/2007 Aota .................... G02B 6/2931
    385/18
2007/0280590 A1* 12/2007 Stowe .................. G02B 6/2713
    385/19

* cited by examiner

WAVELENGTH SELECTIVE SWITCH

CROSS REFERENCE TO RELATED APPLICATIONS

This application claims priority to Chinese Patent Application No. 201610776059.9 filed on Aug. 30, 2016 entitled "A LIQUID CRYSTAL-BASED WAVELENGTH SELECTIVE SWITCH," and Chinese Patent Application No. 201610768927.9 filed on Aug. 30, 2016 entitled "A WAVELENGTH SELECTIVE SWITCH," both of which are hereby incorporated by reference in their entireties.

FIELD OF THE INVENTION

The present disclosure generally relates to optical communications, and more particularly, the present disclosure relates to wavelength selective switches.

BACKGROUND OF THE INVENTION

The current wavelength selective switches mainly include the following three forms: MEMS (Micro-Electro-Mechanical System)-based switches, LCOS (Liquid Crystal on Silicon)-based switches, and LC (Liquid Crystal)-based switches. Such three types of wavelength selective switches generally include an I/O (Input/Output) collimator, a beam expanding device, a light splitting device, a focusing device, and an attenuation switching device arranged in this order along an optical path. The I/O collimator may be formed by an array of fibers and a corresponding array of micro lens, or it may be formed by directly assembling a plurality of single collimators. The beam expanding device may include a set of prisms, or a plurality of lenses with respective predetermined focal lengths. The light splitting device generally includes a dispersion grating, which may be a transmission grating or a reflection grating. The focusing device may include a set of lenses or a concave mirror to focus light of various wavelengths from respective ports onto a focal plane. The attenuation switching device may be located at or near the focal plane to adjust optical power of and select output ports for respective wavelengths. Currently there are three types of attenuation switching devices that are commercially available: MEMS-based attenuation switching devices, LCOS-based attenuation switching devices, and liquid crystal plus birefringent wedge-based attenuation switching devices. In addition, if linear polarized light is required for any of the above optical components, a birefringent polarizer should be added into the optical path.

Among the three types of wavelength selective switches, the LC-based switch is favored because of its advantages such as good stability, mature process, and low cost. The LC-based wavelength selective switch includes a liquid crystal attenuation switching device for selection of output ports and adjustment of optical output power, which further includes a liquid crystal cell for attenuating and one or more liquid crystal cells for switching.

SUMMARY OF THE INVENTION

In the LC-based wavelength selective switch, each liquid crystal cell generally includes a layer of liquid crystal encapsulated between two transparent substrates. Due to such a structure and physical properties of liquid crystal material included therein, the liquid crystal cell will demonstrate temperature-related characteristics: its liquid crystal region becomes convex at high temperature and becomes concave at low temperature. The temperature-induced deformation of the LC cells causes the focal length of the optical system to vary with temperature. Since the LC cell usually has an elongated strip shape, its concave/convex deformation will affect the focal length of the optical path mostly in a direction of the shorter side thereof, that is, the port-switching direction. Therefore, when the temperature changes, the system indexes such as insertion loss and inter-port spacing will change accordingly, which results in deterioration of temperature stability of the switch.

On the other hand, in view of the fact that the wavelength selective switch necessarily includes the above-mentioned components, several challenges arise when making the wavelength selective switch. For example, the optical path is too large, and too many components need to be packaged, or the like. In addition, in order to improve bandwidth, it needs to enhance dispersion capability of the grating, which will increase width difference of components for respective wavelengths in the attenuation switching device, thereby increasing difficulty in the manufacture process of the attenuation switching device and causing components for the respective wavelengths to have different performance.

In order to solve one or more of the above-mentioned problems, an aspect of the present disclosure provides a wavelength selective switch comprising a liquid crystal (LC)-based attenuation switching device. The LC-based attenuation switching device may include: an LC switching module to switch an incident beam into one of a plurality of output paths, the LC switching module including one or more LC switching cells; a mirror to reflect the beam from the LC switching module so as to output the beam through a corresponding output port; and a temperature compensation module provided on a side of the mirror opposite to the LC switching module, the temperature compensation module being configured to alter curvature of the mirror as temperature changes so as to compensate for deformation of the LC switching cells due to the temperature change.

Another aspect of the present disclosure provides a wavelength selective switch comprising a beam expanding device including a plurality of pairs of prisms arranged in sequence along an optical path to expand an incident beam; a reflective dispersion device to reflect and disperse the beam from the beam expanding device such that the reflected beam passes again through at least one pair of the plurality of pairs of prisms of the beam expanding device; a focusing device to focus the beam passing again through the at least one pair of prisms onto a focal plane; and an attenuation switching device provided at or near the focal plane to adjust attenuation of and select an output port for the beam.

The above and other features and advantages of the present disclosure will become apparent from the following description of exemplary embodiments taken in conjunction with the appended drawings.

BRIEF DESCRIPTION OF THE DRAWINGS

Some exemplary embodiments of the present disclosure are illustrated in the appended drawings. It is to be understood that the drawings are not necessarily drawn to scale.

DETAILED DESCRIPTION OF THE PREFERRED EMBODIMENT

An exemplary embodiment of the present disclosure is described below in connection with the appended drawings. Throughout the drawings, the same or similar reference numerals denote the same or similar elements, and a repetitive description thereof will be omitted.

Figure 1:
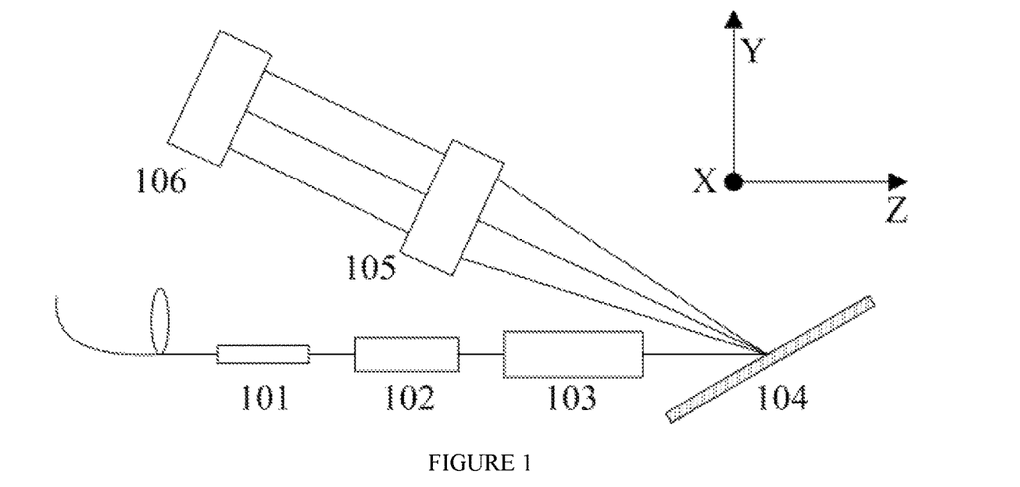
FIG. 1 is an optical path configuration diagram illustrating a wavelength selective switch according to an embodiment of the present disclosure.

FIG. 1 shows an optical path diagram of a wavelength selective switch 100 according to an embodiment of the present disclosure. Particularly, FIG. 1 shows the optical path configuration of the LC-based wavelength selective switch 100 in the wavelength spreading plane, i.e., the grating dispersion plane. As shown in FIG. 1, the wavelength selective switch 100 may include an I/O collimator 101, a birefringent polarizer 102, a beam expanding device 103, a light splitting device (for example, a dispersion grating) 104, a focusing device 105, and a temperature compensation liquid crystal (LC) attenuation switching device 106 arranged in this order along the optical path.

The I/O collimator 101 may include an array of micro lenses corresponding to a plurality of optical fibers, respectively. The plurality of optical fibers may be arranged in the X-axis direction in FIG. 1, and may include at least one input fiber and two or more output fibers. The input optical signal may be provided to the birefringent polarizer 102 after being collimated through the I/O collimator 101. The birefringent polarizer 102 may convert the incoming light beam, which may consist of mixed light, into a linearly polarized beam. In an embodiment, the birefringent polarizer 102 may include a birefringent crystal that converts the mixed light into two linearly polarized light rays having polarization directions perpendicular to each other, which are also called as ordinary ray (o-ray) and extraordinary ray (e-ray). Then a half-wave plate may be used to rotate the polarization direction of one of the two light rays by 90 degrees, thereby obtaining two linearly polarized light rays parallel to each other having the same polarization direction. The beam expanding device 103 may include one or more prisms to expand the linearly polarized beam from the birefringent polarizer 102. In an example, the beam expanding device 103 may include a plurality of prisms arranged into pairs, which will be described in more detail later. The expanded beam may be split by the dispersion grating 104 into a plurality of beams with respective wavelengths corresponding to a plurality of channels, which may be referred to as channel beams. In the example shown, the dispersion grating 104 may be a reflective grating. The focusing device 105 may include one or more lenses, or include one or more concave mirrors, to focus the channel beams onto the temperature compensation LC attenuation switching device 106 located at or near a focal plane. The temperature compensation LC attenuation switching device 106 can adjust attenuation of and select output ports for the incident beams.

Figure 2:
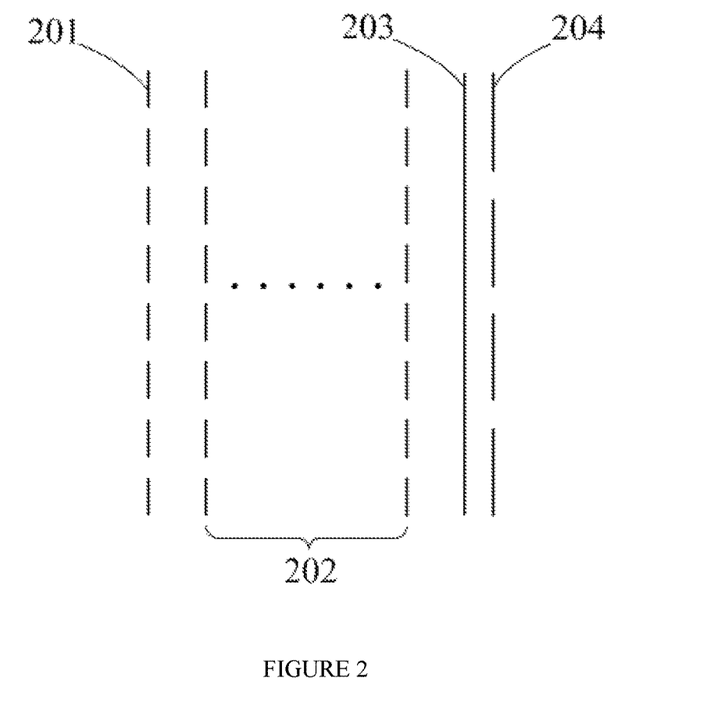
FIG. 2 is a schematic diagram showing a configuration of an LC-based attenuation switching device according to an embodiment of the present disclosure.

FIG. 2 shows a schematic configuration of the temperature compensation LC attenuation switching device 106 according to an embodiment of the present disclosure. As shown in FIG. 2, the temperature compensation LC attenuation switching device 106 may include an LC attenuation module 201, an LC switching module 202, a mirror 203 and a temperature compensation module 204.

The LC attenuation module 201 may include an ECB (Electrically Controlled Biregringent) LC cell and a polarization analyzer. The ECB LC cell can alter the polarization direction of the incident light in accordance with the electric field applied on the liquid crystal contained therein. Therefore, by controlling an angle between the polarization direction of the light exiting from the ECB LC cell and the polarization axis of the analyzer, the amount of light passing through the analyzer can be adjusted, thereby achieving attenuation adjustment of the incident light. For the sake of simplicity and clarity, the LC attenuation module 201 is represented by a layer of liquid crystal in FIG. 2.

The LC switching module 202 may include M LC switching cells (for example, TN liquid crystal cells) interleaved with M birefringent polarizers (for example, birefringent wedges), where M is an integer more than or equal to one, and they may be adhered to each other with an adhesive agent. Each LC switching cell and a corresponding birefringent polarizer may direct the incident light into two different paths. Thus, the LC switching module 202 may deflect the incident light from the LC attenuation module 201 into one of $2^M$ directions depending on state of the M LC switching cells, thereby realizing selection of the output ports. For the sake of simplicity and clarity, the LC switching module 202 is represented by a plurality of layers of liquid crystal in FIG. 2.

The beam exiting from the LC switching module 202 may be reflected by the mirror 203 and then go back substantially along the original path with only a certain shift in the X direction. Thus, after being collimated by the I/O collimator 101, it is incident into a desired output optical fiber. For the sake of simplicity and clarity, the mirror 203 is shown as a solid line in FIG. 2.

Figure 3:
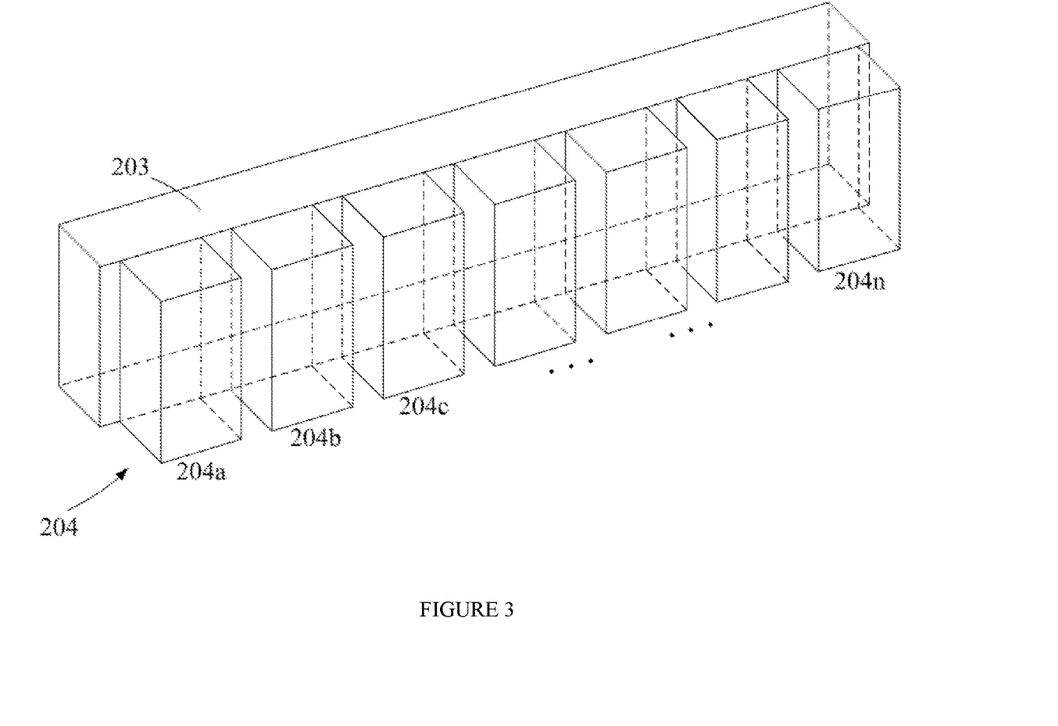
FIG. 3 is a schematic diagram illustrating a mirror attached with a temperature compensation module according to an embodiment of the present disclosure.

FIG. 3 illustrates the mirror 203 and the temperature compensation module 204 fixed (e.g., adhered) thereto according to an embodiment of the present disclosure. The mirror 203 may have an elongated strip shape with a long side parallel to the light-splitting direction of the dispersion grating 104 and a short side perpendicular to the light-splitting direction. That is, the short side of the mirror 203 may be in the X-axis direction (see FIG. 1). Although not shown, the LC cells in the LC attenuation switching device 106 may have a shape similar to the mirror 203 and be disposed opposite to the mirror 203 so that the mirror 203 can reflect light from the LC attenuating switching device 106 back to the LC attenuation switching device 106.

The temperature compensation module 204 may be adhered to the back side of the mirror 203 opposite to the LC attenuation switching device 106. In the embodiment shown in FIG. 3, the temperature compensation module 204 may include a plurality of elongated strip elements 204a to 204n, which are also collectively referred to as strip elements 204. The long side of each strip element 204 may be aligned parallel with the short side of the mirror 203, that is, in the X-axis direction as shown in FIG. 1. In other words, each strip element 204 extends in the lateral direction of the mirror 203, and the plurality of strip elements 204 are arranged in the longitudinal direction of the mirror 203. The strip elements 204 may be made of materials with a higher coefficient of thermal expansion than that of the mirror 203. In some preferred embodiments, the strip elements 204 may be made of metal or alloy materials. Examples of materials that may be used to form the strip elements 204 include, but not limited to, iron, copper, stainless steel, chromium, and chrome-molybdenum alloys.

Figure 4A:
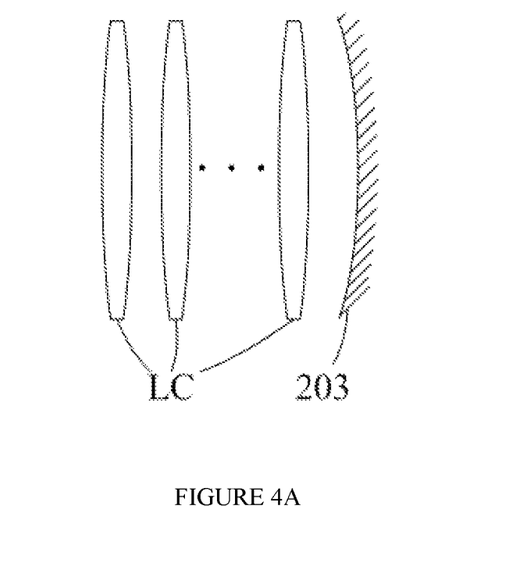
FIGS. 4A and 4B are schematic diagrams showing principle of temperature compensation for an LC switching cell according to an embodiment of the present disclosure.
Figure 4B:
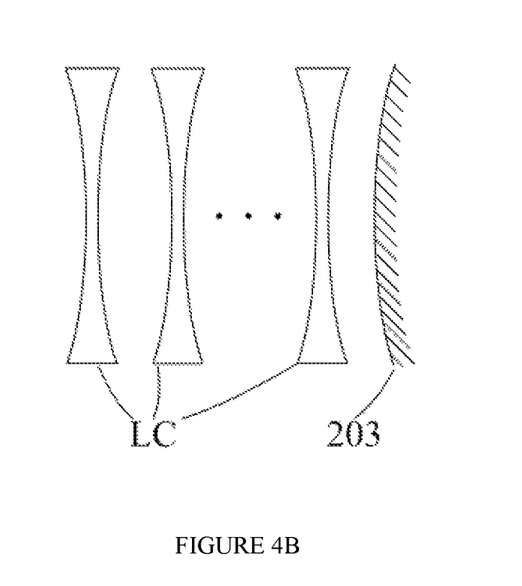

As mentioned earlier, the LC cells may have a certain degree of convex/concave deformation as the temperature changes, thus affecting the focal length of the optical system. The influence of the deformation mainly occurs in the short-side direction of the elongated LC cells (the X-axis direction in FIG. 1), which is also the output port-switching direction. FIGS. 4A and 4B are structural diagrams showing principle of temperature compensation for the LC cells according to an embodiment of the present disclosure, wherein FIG. 4A shows a case that the temperature increases, and FIG. 4B shows a case that the temperature decreases. As shown in FIG. 4A, when the temperature increases, the LC cells ("LC" in FIGS. 4A and 4B) become convex in the X-axis direction (i.e., the output port-switching direction), which are equivalent to a plurality of convex lenses being added into the optical path. In this case, since the coefficient of thermal expansion of the strip elements 204 (shown in FIG. 3) is larger than that of the mirror 203, the strip elements 204 bend the mirror 203 to have a certain curvature along its short-side direction and become a concave mirror. In particular, since the plurality of strip elements 204 are arranged along the long-side direction of the mirror 203 (i.e., the light-splitting direction of the dispersion grating 104) and spaced apart from each other as shown in FIG. 3, the mirror 203 bends little along the long-side direction, which cause a curvature much less than its curvature along the short-side direction (the X-axis direction in FIG. 1).

On the contrary, when the temperature decreases, as shown in FIG. 4B, the LC cells LC become concave in the X-axis direction, which are equivalent to a plurality of concave lenses being added into the optical path. In this case, the strip elements 204 bend the mirror 203 to have a certain curvature along its short-side direction and become a convex mirror. In particular, since the plurality of strip elements 204 are arranged along the long-side direction of the mirror 203 (i.e., the light-splitting direction of the dispersion grating 104) and spaced apart from each other as shown in FIG. 3, the mirror 203 bends little along the long-side direction, which causes a curvature much less than its curvature along the short-side direction (the X-axis direction in FIG. 1).

Figure 5A:
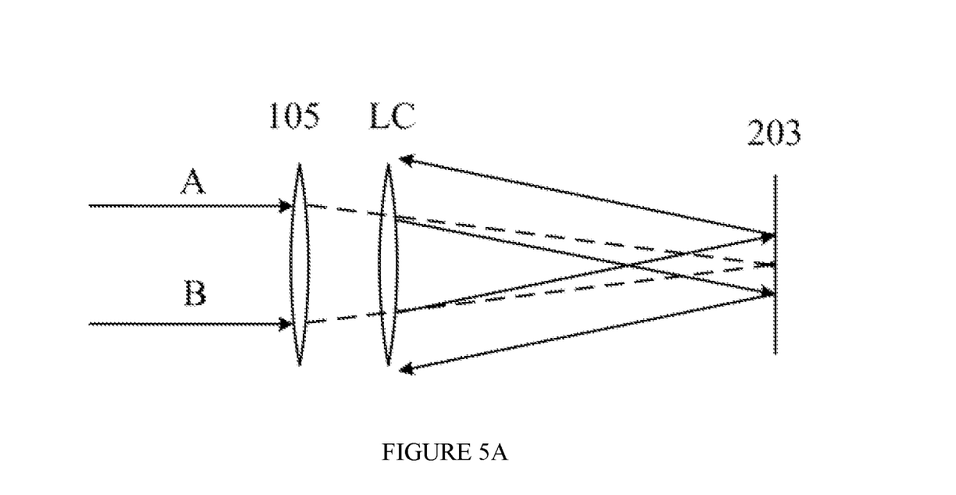
FIGS. 5A and 5B are optical path diagrams illustrating principle of temperature compensation for the LC switching cell according to an embodiment of the present disclosure.
Figure 5B:
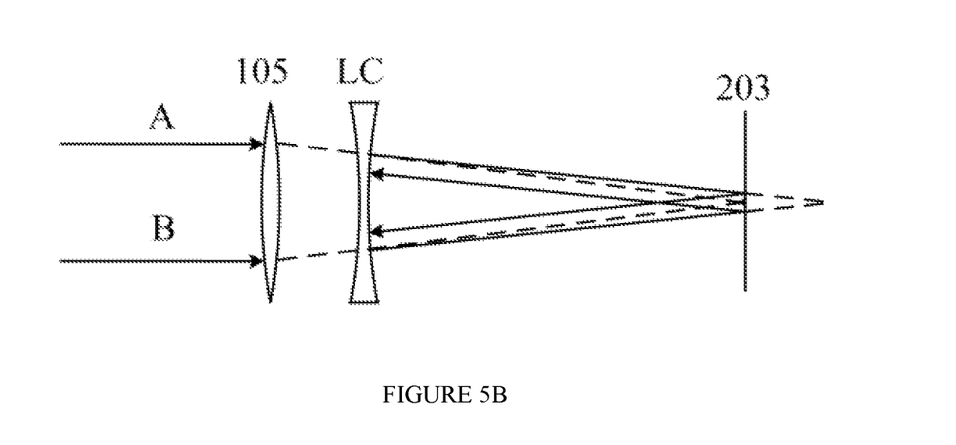

FIGS. 5A and 5B are schematic optical path diagrams showing principle of the temperature compensation according to an embodiment of the present disclosure, wherein FIG. 5A shows a case where the temperature increases, and FIG. 5B shows a case where the temperature decreases. Referring first to FIG. 5A, when the temperature is in a normal range, the incident beams A and B are focused by the focusing device 105, pass through the LC cell LC, and are reflected by the mirror 203, getting back along paths B and A, respectively (as shown by dashed lines). When the temperature increases, the LC cell LC becomes convex, which is equivalent to a convex lens being added into the optical path (there may be two or more convex lenses corresponding to two or more LC cells, although only one is shown in FIG. 5A), so that the focal length for the incident beams A and B becomes shorter, and the beams reflected by the mirror 203 deviate outward from the original reflection paths, as shown by the solid lines. In this case, if the mirror 203 is a concave mirror, the reflected beams may be deflected inward so as to be closer to or in consistence with the original reflection paths, thereby compensating for deformation of the LC cell due to the temperature increasing.

On the other hand, as shown in FIG. 5B, when the temperature decreases, the LC cell LC becomes concave, which is equivalent to a concave lens being added into the optical path (there may be two or more concave lenses corresponding to two or more LC cells, although only one is shown in FIG. 5B), so that the focal length for the incident beams A and B becomes longer, and the beams reflected by the mirror 203 deviate inward from the original reflection paths, as shown by the solid lines. In this case, if the mirror 203 is a convex mirror, the reflected beams may be deflected outward so as to be closer to or in consistence with the original reflection paths, thereby compensating for deformation of the LC cell due to the temperature decreasing.

According to the principles described above, influence of deformation of the LC cells due to the temperature change may be compensated for or cancelled out by selecting proper materials for the mirror 203 and the strip elements 204 and designing and optimizing size and arrangement of the strip elements 204, thereby improving the temperature stability of the wavelength selective switch 100.

Referring back to FIG. 3, in addition to being in proportion to the temperature change, the curvature of the mirror 203 is also related to coefficient of thermal expansion, flexural rigidity, size, and distribution of the strip elements 204. The higher the coefficient of thermal expansion of the strip elements 204, the greater the curvature of the mirror 203. The higher the flexural rigidity of the strip elements 204, the greater the curvature of the mirror 203. The flexural rigidity of each strip element 204 is related to its elastic modulus and size, which may be described by an equation $EI=E(bh^3)/12$, wherein EI is the flexural rigidity, E is the elastic modulus, I is the inertia moment of the cross section of the strip element 204 with respect to the centroid, b is the width of the strip element 204, and h is the thickness of the strip element 204. The strip elements 204 may be arranged densely such that the space between two adjacent strip elements 204 is no more than half of the width of the strip element.

In order to compensate for temperature-induced deformation of the LC cells, first it needs to setup a test optical path to identify the deformation characteristics of the LC cells as the temperature changes, and then to determine parameters of the mirror and the strip elements so as to achieve a proper compensation. If the deformation characteristics of the LC cells are even along the longitudinal direction, the strip elements such as metal strips 204 may be distributed uniformly in the longitudinal direction as shown in FIG. 3. If the deformation characteristics of the LC cells are uneven along the longitudinal direction, distribution of the metal strips 204 may be adjusted along the longitudinal direction so as to accommodate to a local fluctuation of deformation characteristics of the LC cells.

Figure 6:
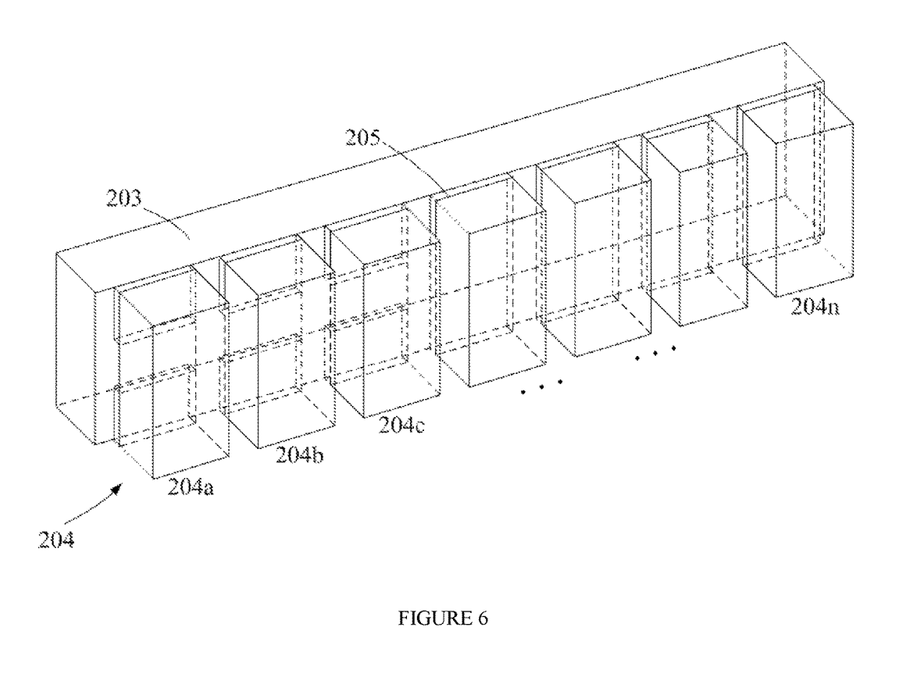
FIG. 6 is a schematic diagram illustrating a mirror attached with a temperature compensation module according to another embodiment of the present disclosure.

FIG. 6 shows a schematic diagram of a mirror 203 with metal strips 204 attached thereto according to another embodiment of the present disclosure. As shown in FIG. 6, an interposer 205 may be provided between the metal strip 204 and the mirror 203. The interposer 205 may be, for example, a glass plate or a metal plate with one side fixed (for example, adhered) to the mirror 203 and the other side fixed (for example, adhered) to the metal strip 204. The interposer 205 can precisely control the portion of the metal strip 204 adhered to the mirror 203 and thus adjust the curvature of the mirror 203 imparted by the metal strip 204. For example, as shown in FIG. 6, a single strip 205 may be interposed between the mirror 203 and each of the four metal strips 204 on the right side, and the single strip 205 may have the same size as the metal strip 204. Also shown in FIG. 6, two small pieces of strips 205 may be interposed between the mirror 203 and each of the three metal strips 204 on the left side. For example, the two small pieces 205 may be attached to both ends of the metal strip 204 and spaced apart from each other. In such a configuration, the curvature of the right part of the mirror 203 will be greater than the curvature of the left part of the mirror 203 with the same temperature change. Although not shown, it will be understood that the arrangement of the interposer 205 may vary as needed. For example, the length of the single strip 205 may be less than the length of the metal strip 204, or the distance between the two small pieces 205 may be shortened to adjust the effective length of the metal strip 204 contributing to the curvature of the mirror 203. Depending on the deformation characteristics of the LC cells, the interposer 205 may have various size and number of pieces and it may be adhered to desirable portions of the metal strips 204 so as to achieve a desirable curvature of the mirror 203. It is to be understood that in addition to the interposer 205, the coefficient of thermal expansion, flexural rigidity and the like of the metal strip 204 can also be adjusted so as to achieve a desirable curvature of the mirror 203.

Figure 7:
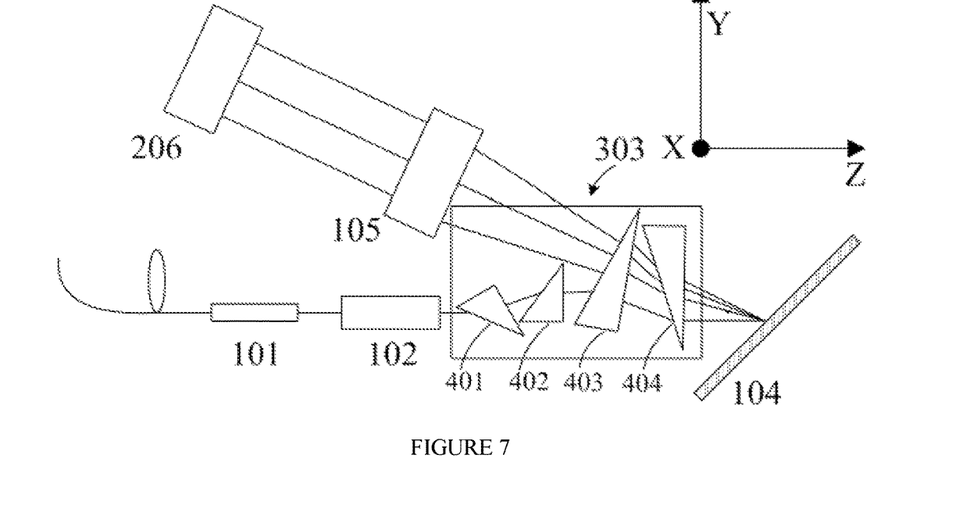
FIG. 7 is an optical path configuration diagram illustrating a wavelength selective switch according to another embodiment of the present disclosure.

FIG. 7 is a schematic diagram of a wavelength selective switch 200 according to another embodiment of the present disclosure and it shows the optical path configuration in the wavelength spreading plane, i.e., the light dispersion plane of the grating. As shown in FIG. 7, the wavelength selective switch 200 includes the I/O collimator 101, the birefringent polarizer 102, a beam expanding device 303, the reflective dispersion grating 104, the focusing device 105, and an attenuation switching device 206 provided in this order along the optical path. The same elements as those of the foregoing embodiments are denoted by the same reference numerals, and a repetitive description thereof will be omitted here.

The beam expanding device 303 may include a plurality of pairs of prisms, each pair including two prisms paired to each other so that the light exiting from the prism pair is substantially parallel with the light incident onto the prism pair. In an embodiment shown in FIG. 7, the beam expanding device 303 may include a first pair of prisms 401 and 402, and a second pair of prisms 403 and 404. It will be understood that the beam expanding device 303 may include more than two pairs of prisms. As shown in FIG. 7, each prism 401, 402, 403, and 404 may have a cross section of a right-angled triangular shape, and when light passes through the beam expanding device 303 the first time, it is incident onto the hypotenuse of each prism and exits from the right angle side of the prism with an exiting angle of about 0 degree.

Figure 8:
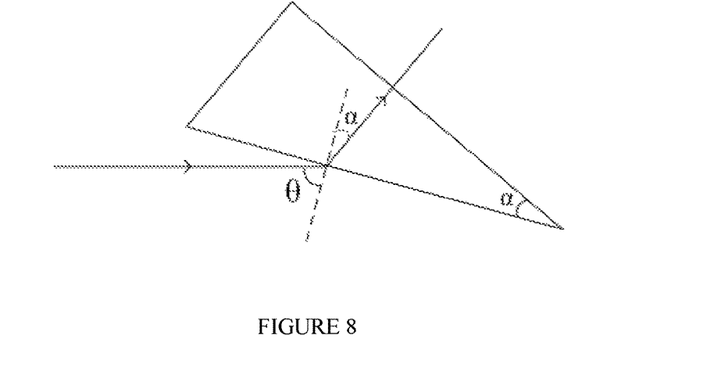
FIG. 8 is a schematic view showing an optical path through a beam expanding prism.

When material and the vertex angle of the prism are determined, the expansion factor of each prism may depend on the incident angle of light on the hypotenuse. As shown in FIG. 8, when light is incident onto the hypotenuse of the prism with a particular incident angle θ, the refraction angle may be equal to the apex angle α of the prism, so that the exiting beam may be substantially perpendicular to the right angle side of the prism, and the expansion factor of the prism may be described by a formula $\cos \alpha / \cos \theta$. Each of the prisms 401, 402, 403, and 404 may be configured to satisfy the formula.

The beam exiting from the beam expanding device 303 may be split by the reflective dispersion grating 104 and then enters again into at least one of the prism pairs in the beam expanding device 303, for example, the second pair of prisms 403 and 404 as shown in FIG. 7. Here, in order for the light reflected by the grating 104 entering again into the second pair of prisms 403 and 404 to separate from the light first entering into the second pair of prisms 403 and 404 prior to reflection by the grating 104 and for that no overlap occurs therebetween, the incident angle and the diffraction angle of the reflective dispersion grating 104 should be sufficiently separated from each other. But if they are separated too far away from each other, the optical path is not compact, and the dispersion capability of the reflective grating 104 is degraded. The incident angle of the reflective grating 104 may have an optimum value so that the light re-entering into the second pair of prisms again after being reflected by the grating 104 is just separated from the light entering into the second pair of prisms the first time. Assuming that the incident angle and the diffraction angle of the reflective grating 104 are θ1 and θ2, respectively, the line number of the reflective grating 104 is Γ, and the diffraction order is m, then the reflective grating 104 has an expansion factor of $\cos \theta 2 / \cos \theta 1$ and a dispersion capability of $m\Gamma/\cos \theta 2$ for a wavelength λ. The expansion factor and the dispersion capability may be selected for the optical path depending on the bandwidth requirement of the optical system.

When the light split (or dispersed) by the grating 104 re-enters into the second pair of prisms 403, 404 from the other side, the splitting angle thereof can be magnified by the second pair of prisms with a magnification factor equal to the expansion factor of the second pair of prisms. Therefore, with respect to the optical path shown in FIG. 7, the total beam expansion factor is equal to the product of the beam expansion factor of the first pair of prisms 401, 402 multiplied by the beam expansion factor of the grating 104, and the total dispersion capability is equal to the product of the dispersion capability of the grating 104 and the expansion factor of the second pair of prisms 403 and 404. The second pair of prisms 403 and 404 each may have an aperture such that the light entering into the second prism pair the first time does not overlap with the light entering into the second prism pair the second time, and neither of them goes beyond the prism pair. The aperture of the prism may be determined according to spot size of the expanded beam, which is equal to the spot size of the collimated input beam multiplied by the expansion factor of the optical path, and the wavelength separation angle, which is equal to the wavelength range multiplied by the dispersion capability of the optical path.

It will be understood that when light passes through the grating 104, it is not dispersed uniformly in the full wavelength range. In particular, the longer wavelength is dispersed more than the shorter wavelength is. However, the dispersion characteristic of the prism is opposite to that of the grating 104. In particular, the shorter wavelength is dispersed by the prism more than the longer wavelength is because the shorter wavelength has a higher refraction index for the same prism. Thus, by using the grating and the prism both to disperse light, embodiments of the present disclosure can improve the dispersion capability and achieve a uniform dispersion in the full wavelength band so that units or components in the downstream attenuation switching device for respective wavelengths may have a more uniform size.

The light further dispersed by the second pair of prisms 403 and 404 may be focused by the focusing device 105 onto the attenuation switching device 206. The attenuation switching device 206 may be a temperature compensation LC attenuation switching device 106 as described above with reference to FIG. 1-6, or it may be any of conventional attenuation switching devices, including but not limited to attenuation switching devices based on MEMS micro mirror array, attenuation switching devices based on LCOS pixel cell array, and attenuation switching devices based on LC cells. As described above, the attenuation switching device 206 may alter the propagation path of the reflected light so as to select an output port for the light.

In the embodiment shown in FIG. 7, by re-using the beam expanding device and the light splitting device, size of the optical path may be reduced, and the number of components may be reduced. The grating may be implemented with a lower dispersion capability while achieving a uniform dispersion in the full band.

Although the present disclosure has shown and described in detail with reference to a specific embodiment, it will be understood by those skilled in the field that various changes in form and detail may be made therein without departing from the spirit and scope of the disclosure. Such changes are intended to be within the scope of protection defined by the claims of the disclosure.

What is claimed and desired to be secured by Letters Patent of the United States is:

1. A wavelength selective switch comprising a liquid crystal (LC)-based attenuation switching device including:
    an LC switching module including one or more LC switching cells to switch an incident beam;
    a mirror to reflect the beam from the LC switching module back to the LC switching module; and
    a temperature compensation module provided on a side of the mirror opposite to the LC switching module, the temperature compensation module being configured to alter curvature of the mirror as temperature changes so as to compensate for deformation of the LC switching cells due to the temperature change.

2. The wavelength selective switch of claim 1, wherein the LC-based attenuation switching device further comprises:
    an LC attenuation module provided upstream of the LC switching module to control attenuation of the incident beam, the LC attenuation module including an ECB (Electrically Controlled Biregringent) LC cell,
    wherein the temperature compensation module is configured to alter the curvature of the mirror as the temperature changes so as to compensate for deformation of the ECB LC cell and the LC switching cells due to the temperature change.

3. The wavelength selective switch of claim 1, wherein the temperature compensation module comprises a plurality of strip elements adhered to the mirror, each strip element is disposed to extend along a first direction of the mirror, and the plurality of strip elements are arranged in a second direction of the mirror different from the first direction.

4. The wavelength selective switch of claim 3, wherein the plurality of strip elements are formed of material having a greater coefficient of thermal expansion than the mirror.

5. The wavelength selective switch of claim 3, wherein the first direction is a short-side direction of the mirror, and the second direction is a long-side direction of the mirror.

6. The wavelength selective switch of claim 3, wherein adjacent strip elements are spaced apart from each other by a distance no more than half of the width of the strip element.

7. The wavelength selective switch of claim 3, wherein the temperature compensation module further comprises an interposer provided between at least one of the plurality of strip elements and the mirror with one side being adhered to the at least one strip element and the other side being adhered to the mirror.

8. The wavelength selective switch of claim 7, wherein the plurality of strip elements are formed of metal, and the interposer is made of glass or metal.

9. The wavelength selective switch of claim 7, wherein the interposer comprises a single piece, or two or more pieces separated from each other in a direction along which the at least one strip element extends.

10. The wavelength selective switch of claim 1, wherein the temperature compensation module is configured to bend the mirror along a first direction of the mirror toward the LC switching module so as to form a concave mirror when the temperature increases, and to bend the mirror along the first direction of the mirror away from the LC switching module so as to form a convex mirror when the temperature decreases.

11. The wavelength selective switch of claim 10, wherein the mirror is substantially not bended along its second direction as the temperature changes.

12. The wavelength selective switch of claim 1, further comprising:
    a beam expanding device including a plurality of pairs of prisms arranged in sequence along the optical path to expand the incident beam;
    a reflective dispersion device to reflect and disperse the beam from the beam expanding device such that the reflected beam enters again into at least one pair of the plurality of pairs of prisms in the beam expanding device; and
    a focusing device to focus the beam exiting from the at least one pair of prisms onto a focal plane, the LC-based attenuation switching device being located at or near the focal plane.

13. The wavelength selective switch of claim 12, wherein each prism of the beam expanding device has a cross section of a right-angled triangular shape and is disposed such that the incident beam is incident onto the hypotenuse of the right-angled triangle and exits from the right-angled side of the right-angled triangle with an exiting angle of about 0 degree, and
    wherein each pair of prisms in the beam expanding device is configured in such a manner that the light beam incident on the pair of prisms is substantially parallel to the light beam exiting from the pair of prisms.

14. The wavelength selective switch of claim 12, wherein the beam expanding device comprises a first pair of prisms and a second pair of prisms, the incident beam passes through the first pair of prisms and the second pair of prisms in sequence, is incident onto and reflected by the reflective dispersion device, passes through the second pair of prisms again, and then is incident onto the focusing device.

15. The wavelength selective switch of claim 12, wherein the light beam is incident on the reflective dispersion device at a predetermined angle such that the light beam re-entering into the at least one pair of prisms after being reflected by the reflective dispersion device is just separated in the at least one pair of prisms from the beam first entering into the at least one pair of prisms.

16. The wavelength selective switch of claim 12 further comprising:
  a birefringent polarizer provided upstream of the beam expanding device to convert the incident beam into a linearly polarized beam.

* * * * *